T. R. SINCLAIRE.
Apparatus for Filtering Liquids Under Pressure.
No. 6,114. Reissued Nov. 3, 1874.
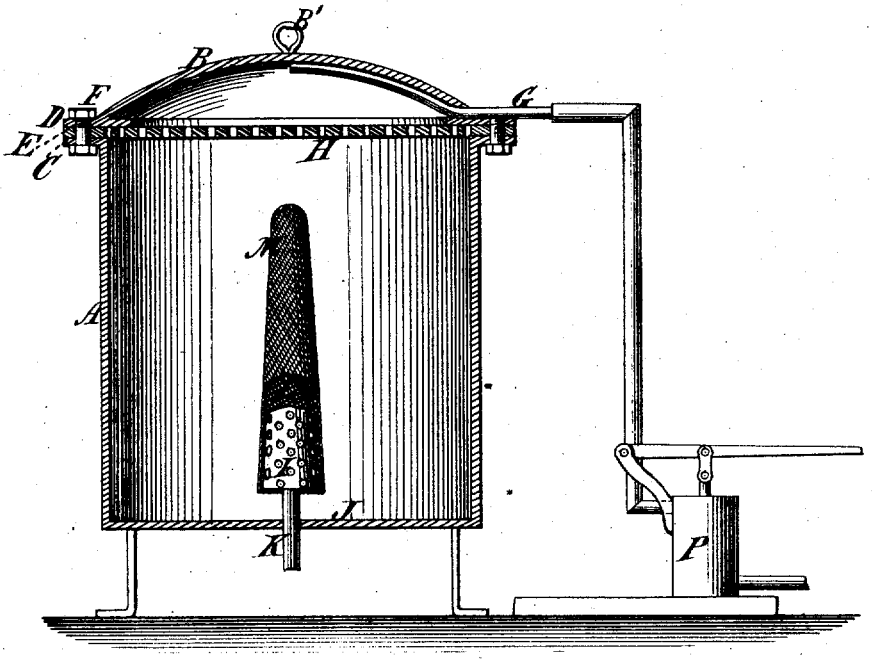
Inventor;
Thos R Sinclaire
Witnesses;
F. J. Keane
A. J. De Lacy.
THE GRAPHIC CO. PHOTO-LITH. 39 & 41 PARK PLACE, N.Y.

UNITED STATES PATENT OFFICE.

THOMAS R. SINCLAIRE, OF NEW YORK, N. Y., ASSIGNOR TO SINCLAIRE RECTIFYING-MACHINE COMPANY, OF SAME PLACE.

IMPROVEMENT IN APPARATUS FOR FILTERING LIQUIDS UNDER PRESSURE.

Specification forming part of Letters Patent No. 120,908, dated November 14, 1871; reissue No. 5,104, dated October 15, 1872; reissue No. 6,114, dated November 3, 1874; application filed October 16, 1874.

*To all whom it may concern:*

Be it known that I, THOMAS R. SINCLAIRE, of the city of New York, in the county and State of New York, have invented an Improvement in Apparatus for Filtering Liquids; and I do hereby declare that the following is a full, clear, and exact description of the same, reference being had to the accompanying drawing forming part of this specification, and which represents, partly by a vertical section and partly by a side view, a filtering apparatus illustrating my invention.

This invention relates to apparatus for filtering liquids under pressure; and its main object is to overcome certain difficulties which have been met with in the use of the filtering apparatus for which Letters Patent of the United States were granted me, dated April 27, 1869, and July 6, 1869. In filtering under pressure on the old plan more or less of the liquid, it has been found, will force its way between the charcoal or other filtering material and the case or sides of the vessel containing the same, or through channels in the filtering material, and will consequently be but partially filtered or clarified, thus rendering the whole operation imperfect and unsatisfactory. To obviate this I combine with an air-tight or hermetically sealed or closed filtering-vessel, and means for introducing the liquid, a perforated or permeable tube or receiver, of conical or other form, arranged so as to extend within the filtering-vessel and have its perforated or permeable portion surrounded by the charcoal or other filtering material.

A is the filtering-vessel, which may be of any suitable size and form, and be provided with a conical or oval top or cover, B, with a ring or eye, B′, for lifting and handling the same. C is a flange around the rim of the vessel. D is the cover-flange. E is packing between the two flanges. The cover is securely confined to the vessel by bolts F, so that the connection will allow liquids to be filtered under pressure, in which case the vessel A becomes air-tight or hermetically sealed or closed. G is a pipe for charging the vessel with the liquid to be filtered under pressure, the said pipe being shown in the drawing as connected with a force-pump, P, and as being arranged to discharge the liquid beneath the conical cover, as represented, though I do not confine myself to this locality for the feed-pipe, nor to a single feed-pipe. H is a perforated plate, which is shown as being placed on the top of the filtering material, and held in position by the inwardly-projecting cover-flange D. I designates a perforated or permeable receiver or receiving-tube, which is shown in the drawing as being attached to the bottom of the vessel A by the delivery-tube K.

In this example of my invention I have shown a perforated conical tube extending from a delivery-tube to near the top of the vessel; but I do not confine myself to this nor to any other particular form, nor to this particular locality, for the receiver or receiving-tube, nor to a single receiver or receiving-tube. The tube I is shown as being covered with wire-gauze L, and outside of the wire-gauze a covering of some textile or fibrous material, M. The filtering-vessel is filled, or partially filled, with charcoal or other filtering material for clarifying or purifying liquids, charcoal being usually employed. By the introduction of the perforated or permeable tube or receiver the liquid is compelled to pass and to be regularly distributed through the body of the filtering material, and in the example shown to be received into the perforated tube or receiver through the coverings thereof, by which operation the liquid is thoroughly filtered and purified.

My main object is to thoroughly filter the liquid by forcing the same uniformly from all parts of the vessel toward the receiving-tube, and by the introduction of a perforated or permeable tube or receiver the object is accomplished, inasmuch as whatever amount of liquid forces its way between the filtering material and the sides of the vessel is compelled to pass through the body of the filtering material and through the said tube or receiver before it can escape from the apparatus. Furthermore, by elevating said tube or receiver within the filtering material above the bottom J of the vessel A, as in the example shown in the drawing, any liquid forcing its way between said bottom and the filtering material will be similarly compelled to pass through the latter into the said tube or receiver before it can escape from the vessel A, thus perfecting the desired result.

What is here claimed, and desired to be secured by Letters Patent, is—

1. The method or process of filtering or clarifying liquids, consisting in conducting the liquid into an air-tight or hermetically sealed or closed filtering-vessel, and causing the said liquid, while under pressure, to pursue a course away from the sides or walls of the said vessel, and to enter a tube or receiver extending into the body of the charcoal or other filtering material, whereby the liquid will be thoroughly filtered, clarified, or rectified without any appreciable loss by evaporation.

2. The combination of the following elements: An air-tight or hermetically sealed or closed vessel for containing charcoal or other filtering material, and an induction or feed pipe through which to charge the vessel with the liquid to be filtered, and a tube or receiver extending into some part of said vessel, to be occupied by the charcoal or other filtering material, the said parts being so constructed and so arranged relatively to each other that the filtered liquid must take a course away from the sides or walls of the said filtering-vessel in order to find its escape from the filtering material into or through said tube or receiver.

3. The combination, with an air-tight or hermetically sealed or closed filtering-vessel, of a perforated or permeable receiver or receiving-tube, communicating with the exterior of said vessel, for the purpose set forth.

4. The combination of the following elements: A filtering-vessel, a forcing apparatus, an induction or feed pipe, and an eduction or delivery pipe, one of the said pipes being perforated or permeable, substantially as herein specified, and so arranged that it shall extend into the body of the filtering material at a central point, or one away from the inner surfaces of the walls of the filtering-vessel, in such manner as to cause the liquid, while under pressure, to percolate the body of the charcoal or other filtering material during the filtering operation.

5. The combination of the receiver I and its supporting-pipe K with a filtering-vessel, arranged and operating substantially as and for the purpose herein specified.

6. The combination of an air-tight or hermetically sealed or closed filtering vessel, an induction or feed pipe, a force-pump or its equivalent, and a tube or receiver extending into some part of the said vessel, to be occupied by the charcoal or other filtering material, substantially as and for the purpose herein specified.

7. The combination of a partition or confining-plate, H, with an air-tight or hermetically sealed or closed filtering-vessel, and an elevated receiver arranged within the said vessel, substantially as and for the purposes herein shown and described.

THOS. R. SINCLAIRE.

Witnesses:

JOS. L. COOMBS,
M. M. LIVINGSTON.